United States Patent
Bruguier et al.

(10) Patent No.: US 12,339,798 B2
(45) Date of Patent: Jun. 24, 2025

(54) TOKENIZATION SYSTEM WITH COMMON BUS ARCHITECTURE

(71) Applicant: AMADEUS S.A.S., Biot (FR)

(72) Inventors: Julien Romuald René Bruguier, Antibes (FR); Nicolas Lionel Duvivier, Antibes (FR); Antoine Vasseur, Marcq-en-Baroeul (FR); Mario Domanico, Nice (FR); Samuel Burdese, Le Cannet (FR); Anatolii Antonov, Antibes (FR)

(73) Assignee: AMADEUS S.A.S., Biot (FR)

( * ) Notice: Subject to any disclaimer, the term of this patent is extended or adjusted under 35 U.S.C. 154(b) by 16 days.

(21) Appl. No.: 18/373,391

(22) Filed: Sep. 27, 2023

(65) Prior Publication Data

US 2024/0143533 A1    May 2, 2024

(30) Foreign Application Priority Data

Oct. 26, 2022   (EP) .................................. 22306623

(51) Int. Cl.
*G06F 13/37* (2006.01)
(52) U.S. Cl.
CPC .................................. *G06F 13/37* (2013.01)
(58) Field of Classification Search
CPC ...... G06F 13/37; H04L 63/0245; H04L 63/04; H04L 63/0428; H04L 63/0471; H04L 63/205
See application file for complete search history.

(56) References Cited

U.S. PATENT DOCUMENTS

| | | | |
|---|---|---|---|
| 11,449,627 B2 | 9/2022 | Bayon et al. | |
| 11,455,422 B2 | 9/2022 | Bayon et al. | |
| 11,646,885 B2 | 5/2023 | Bayon et al. | |
| 2013/0212024 A1 | 8/2013 | Mattsson et al. | |
| 2014/0150060 A1 | 5/2014 | Riley | |
| 2017/0091758 A1* | 3/2017 | Kim | G06Q 20/227 |
| 2017/0093812 A1* | 3/2017 | Schenk | H04L 51/214 |
| 2017/0374093 A1* | 12/2017 | Dhar | G06Q 50/265 |
| 2018/0005236 A1* | 1/2018 | Miyamoto | G06Q 20/10 |
| 2018/0083924 A1 | 3/2018 | Hosie et al. | |
| 2020/0334376 A1* | 10/2020 | Bragdon | G06F 21/6245 |
| 2021/0256150 A1* | 8/2021 | Bayon | H04L 63/062 |

* cited by examiner

*Primary Examiner* — Phong H Dang

(74) *Attorney, Agent, or Firm* — PERRY + CURRIER INC.

(57) ABSTRACT

An interception module used in a tokenization system is provided. The tokenization system comprises a source and a target, a common bus architecture, and a tokenizer. The source and the target, the interception module and the tokenizer are communicatively coupled via the common bus architecture. The interception module is configured to intercept a message transmitted from the source directed to the target via the common bus architecture, and in response to determining that the message comprises sensitive data, forward the intercepted message to the tokenizer for tokenization or detokenization.

14 Claims, 11 Drawing Sheets

TOKENIZATION SYSTEM WITH COMMON BUS ARCHITECTURE

FIELD

The present disclosure is generally related to information technology security, and more specifically to the field of data tokenization.

BACKGROUND

According to US 2013/0212024 A1, data can be protected in mobile and payment environments through various tokenization operations. A mobile device can tokenize communication data based on device information and session information associated with the mobile device. A payment terminal can tokenize payment information received at the payment terminal during a transaction based on transaction information associated with the transaction. Payment data is tokenized using a first set of token tables and according to a first set of tokenization parameters by a first payment entity and can be detokenized or re-tokenized with a second set of token tables and according to a second set of tokenization parameters. Payment information can be tokenized and sent to a mobile device as a token card based on one or more selected use rules, and a user can request a transaction based on the token card. The transaction can be authorized if the transaction satisfies the selected use rules.

SUMMARY

According to a first aspect, an interception module used in a tokenization system is provided. The tokenization system comprises a source and a target, a common bus architecture, and a tokenizer, wherein the source and the target, the interception module and the tokenizer are communicatively coupled via the common bus architecture. The interception module is configured to:
intercept a message transmitted from the source directed to the target via the common bus architecture, and
in response to determining that the message comprises sensitive data, forward the intercepted message to the tokenizer for tokenization or detokenization.

In some examples, the interception module is arranged to forward the message according to interception rules, wherein interception rules define which messages from the source are to be forwarded to the tokenizer before forwarding the message processed by the tokenizer to the target and which messages from the source are to be forwarded to the target without processing by the tokenizer.

In some examples, the substitution rules for the tokenizer define which type of sensitive data should be replaced by which type of token.

In some examples, the substitution rules are stored locally at the tokenizer.

In some examples, the tokenization system comprises a plurality of tokenizers and the interception module is configured to forward the message to a particular one of the plurality of tokenizers based on the type of the sensitive data.

In some examples, different tokenizers are provided for tokenizing different data types and/or data formats.

In some examples, the messages received by the common bus architecture comprise an indicator from which the interception module can determine which tokenizer should be used to tokenize the sensitive data in the messages.

In some examples, the source and/or the target is in one of the following migration states: fully migrated to a tokenization ready state, partially migrated to a tokenization ready state, and not migrated to a tokenization ready state.

In some examples, the interception rules determine whether or not the intercepted message is to be forwarded to a particular one of the plurality of tokenizers depending on the migration state of the source and/or the target.

In some examples, the interception module is configured to forward the message to a particular one of the plurality of tokenizers based on the migration state of the source and/or the target.

In some examples, the tokenizer provides a format translation from a first data format associated with the source to a second data format associated with the target.

In some examples, in response to determining that a data format of the message is associated with both, the source and the target, the interception module is configured to forward the message from the source to the target with said data format.

In some examples, the interception module is configured to break the communication between the source and the target when it is determined that the tokenizer is faulty, and wherein the interception module is configured to send an error message to the source.

In some examples, the interception module is configured to reject a message from the source when it is determined that the tokenizer is faulty, thereby preventing a token leakage.

In some examples, when it is determined that the tokenizer is faulty, data transmission in the clear between the source and the target is allowed as a fall-back via the common bus architecture.

In some examples, the source and/or the target is/are an entity, an application or an internal system or an external system.

According to a second aspect, a computer-implemented method of tokenizing data exchanged between two or more applications is provided. The method comprises:
intercepting, by an interception module, data from the at least one source, wherein at least one of the messages comprises sensitive data, wherein the interception module is part of a common bus architecture to which the two or more sources and targets are connected, wherein the two or more sources and targets communicate with each other via the common bus architecture, and
tokenizing sensitive data, via a tokenizer, wherein the tokenizer is coupled to the common bus architecture and receives the sensitive data via the common bus architecture.

The computer-implemented method of tokenizing data exchanged between two or more applications according to the second aspect may be implemented using an interception module according to the first aspect and any example related to the first aspect.

According to a third aspect, a computer program product is provided, which comprises program code instructions stored on a computer readable medium to execute the method steps according to the second aspect, when said program is executed on a computer device.

According to a fourth aspect, a computerized system of tokenization of data exchanged between one or more sources and targets is provided. The computerized system comprises:
at least one processor;
at least one non-volatile memory;
at least one source and target;

a common bus architecture to which the at least one source and target are connected, and via which the at least two sources and targets communicate using messages;

an interception module, which is a part of the common bus architecture;

a tokenizer, being coupled to the common bus architecture;

program code, stored in the non-volatile memory, causing the at least one processor to:

intercept messages, by the interception module, from the at least one source and target, wherein at least one of the messages comprises sensitive data; and receive and tokenize, by the tokenizer, sensitive data received via the common bus architecture.

In some examples, the interception module is arranged to forward the message according to interception rules, and wherein the tokenizer is arranged to tokenize sensitive data according to predefined substitution rules.

In some examples, the substitution rules are stored locally at the tokenizer.

In some examples, the interception rules and the substitution rules enable the common bus architecture, the interception module and the at least one tokenizer to manage communication between sources and targets that are either fully migrated, partially migrated or not migrated to a tokenization ready state.

In some examples, the source is an entity sending a message to the common bus architecture and a target is an entity receiving a message from the common bus architecture, wherein the source is either an application or a system and the target is either an application or a system.

In some examples, the tokenization is performed in the tokenization system without being exposed to clients of the application or system representing the source or target, which send and receive sensitive data without tokenization or encryption.

General Description

According to the first aspect, an interception module used in a tokenization system is provided. Tokenization, in data security, is the process of substituting a sensitive data element with a non-sensitive equivalent, referred to as a token that has no extrinsic or exploitable meaning or value. The token is a reference (i.e. identifier) that maps back to the sensitive data through a tokenization system. The mapping from original data to a token uses methods that render tokens infeasible to reverse in the absence of the tokenization system, for example using tokens created from random numbers.

The tokenization system comprises a source and a target, a common bus architecture, and a tokenizer. The tokenizer is capable of tokenizing, i.e. replacing sensitive data with non-sensitive data and de-tokenizing, i.e. again replacing non-sensitive data with sensitive data. The tokenizer may be applied to any type of sensitive data like a phone number, a personal address, a credit card number, a passport number etc. The source and the target may refer to any source and target of messages carrying this sensitive information or non-sensitive information. Examples for sources and targets are applications and/or services and/or external or internal systems, such as frontend and backend servers.

Via the tokenizer, sensitive data may be replaced on an internal network. For example, at the airport, passport related data may be tokenized and then de-tokenized in the application using the passport related data. An error code in an error message of an airport system may be tokenized and may be de-tokenized in an error handler application using the error message. The client, e.g. an application sending messages towards the tokenization system, typically may not be aware of the tokenization, but only "knows" that the data is protected.

The source and the target, the interception module and the tokenizer are communicatively coupled via the common bus architecture. This generally means that any communication between the source and the target is conveyed via the common bus architecture. Hence, a message from the source to the target is received by the common bus architecture, which (finally) forwards the message to the target. The interception module may run on the common bus architecture in order to intercept messages from the source to the target. The roles of source and target may be interchangeable, i.e. the target may return a message to the source, thereby itself becoming a source and the source becoming a target for the return message considered.

The common bus architecture and/or the tokenizer may be provided via a generic engine that is able to be fed with any type of sensitive data and may enable the interception module to target several (different) tokenizers. In this way, a versatile and centralized configuration for the tokenization system may be provided. The common bus architecture may be an enterprise service bus.

The interception module is configured to intercept a message transmitted from the source directed to the target via the common bus architecture. Generally, the interception module may intercept any message regardless of whether the message contains sensitive data or not. It may rather be evaluated downstream of the interception module whether the message indeed contains sensitive data or nor.

The interception module is configured to, in response to determining that the message comprises sensitive data, forward the intercepted message to the tokenizer for tokenization or detokenization.

Upon identification that sensitive data is present in a message, the interception module may forward the message including the sensitive data to the tokenizer. Should the interception module identify that there is no sensitive data present in the message, then the message may be forwarded to the target without tokenization or detokenization.

Applications acting as sources and/or targets may be isolated from each other via the common bus architecture. Applications may communicate with each other via the common bus architecture regardless of the format of the sensitive data used by the applications. The common bus architecture, for example, acts as a central routing hub to control the communication of sensitive data and to prevent the leakage of sensitive data or a token representing the sensitive data.

Tokenization may be provided regardless of the message protocol. The centralization of the interception via the common bus architecture reduces maintenance costs, since only the centralized bus architecture has to undergo maintenance such as configuration or software updates. With decentralized tokenizers, each logical entity employing a tokenizer would have to undergo maintenance.

With the tokenization system including the common bus architecture the tokenization applied may be generic, but may be embedded in a middleware complex.

Should changes in the configuration of the tokenization system, in particular, the tokenizer be performed, no change of application code, in applications forming the source or the target, is necessary. It may suffice to change a config file with setting configurations of the tokenization system, in particular, configurations of the tokenizer. The changes can be done by non-application specific programmers.

The tokenization process is quasi-transparent for the applications. The present tokenization solution is located at the common bus architecture and is thus invisible from a client perspective and is compatible with a multi-datacenter architecture.

This centralized tokenization structure provides for light and/or easy security audits, as well as for control over all sensitive data processed to avoid frauds and data leaks and to avoid ransomware attacks. The centralized tokenization structure further provides for an easy identification and monitoring of sensitive data presence in flows.

In some examples, the interception module is arranged to forward the message according to interception rules. The interception rules may define which messages from the source are to be forwarded to the tokenizer before forwarding the message processed by the tokenizer to the target and which messages from the source are to be forwarded to the target without processing by the tokenizer.

The interception rules, for example, define that a message sent by or to be received by an application dealing with sensitive data has to be forwarded to a tokenizer, whereas a message sent by or to be received by an application that deals with non-sensitive data is not forwarded to the tokenizer.

The interception rules may define that a message to and/or from an application for evaluating passport data is to be forwarded to the tokenizer. Likewise, the interception rules may define that a message to and/or from payment related applications is to be forwarded to the tokenizer. In the same way, the interception rules may define that a message to and/or from an application dealing with advertisement is not to be tokenized and detokenized.

In some examples, substitution rules for the tokenizer define which type of sensitive data is to be replaced by which type of token.

There are also different options for the type of token or tokenization to be applied by the at least one tokenizer. Non-limiting examples of these different tokenization techniques are non-fungible tokens, vault tokenization or vaultless tokenization.

Non-fungible tokens provide a digital representation of unique assets, and this type of tokenization has prolific use cases. Vault tokenization involves the maintenance of a secure database storing sensitive data. At the same time, the tokenization vault database also stores the corresponding non-sensitive data for the sensitive information. Users can be able to decrypt the newly tokenized data with the help of sensitive and non-sensitive data tables.

Vaultless tokenization provides a potentially safer alternative to vault tokenization. Rather than maintaining a database, vaultless tokenization focuses on using secure cryptographic devices. The secure cryptographic devices uses algorithms based on certain standards for conversion of sensitive data to non-sensitive data. The tokens created in vaultless tokenization could be decrypted for obtaining original data without a tokenization vault database.

The tokenizer may detect which kind of sensitive data is contained in the message received by the tokenizer. Depending on the substitution rules, the tokenizer may apply a particular type of tokenization and/or produce a particular type of token. To provide an example, for a message including passport data, vault tokenization may be applied, while for a message including payment data, vaultless tokenization may be applied.

In some examples, the substitution rules are stored locally at the tokenizer. By storing the substitution rules locally at the tokenizer, no communication to external modules is necessary in order to read out the substitution rules.

By an update of the tokenizer, also the substitution rules may be updated. The substitution rules may be stored in a configuration file of the at least one tokenizer. The update of the tokenizer may occur through an update of the configuration file. The tokenization system may involve an external part to push a part of the configuration file to the common bus architecture, e.g. an enterprise service bus. This makes it possible to update e.g. the substitution rules quickly by pushing a new configuration file to the common bus architecture. This configuration file may be the updated configuration file for the tokenizer.

The tokenizer will replace the sensitive data by a token in response to detecting sensitive data in the message according to the substitution rules.

In some examples, the tokenization system comprises a plurality of tokenizers and the interception module is configured to forward the message to a particular one of the plurality of tokenizers based on the type of the sensitive data and e.g. based on the interception rules.

It may be decided based on interception rules that messages from specific sources, e.g. applications, are to be forwarded to a particular tokenizer: The interception module may be configured that after its interception a message A is forwarded to a tokenizer A and a message B is forwarded to a tokenizer B and a message C is forwarded to a tokenizer C.

In some examples, the messages received by the common bus architecture comprise an indicator from which the interception module can determine which tokenizer should be used to tokenize the sensitive data in the messages.

A flag in metadata of a message (e.g. in a message header) or within the message content itself may indicate to the interception module which tokenizer is to be used for which type of data. The interception module may forward the flags identified in the metadata of the messages or the messages themselves to the tokenizer(s) indicating the format of the message and/or the sensitive data. Several tokenizers can be targeted by the interception module.

In some examples, different tokenizers are provided for tokenizing different data types and/or data formats.

Each of the multiple tokenizers provided may apply a different tokenization method, like vault tokenization, vaultless tokenization, or non-fungible tokenization. The sources and/or targets may transmit messages of different formats towards the common bus architecture, where these messages are intercepted. A first application may send messages in a payment data related format, while another application may send messages in a passport verification related format.

Nonetheless, sources and targets (such as applications) that use different message formats may communicate with each other via the common bus architecture. This provides for application isolation in terms of the message format used.

The interception module and tokenizer may be programmed to receive a message in a particular format and to tokenize the sensitive data in a particular format that is readable by an application, which is intended to receive the message in this particular format, but with the sensitive data replaced by a token.

In some examples, the tokenizer provides a format translation from a first data format associated with the source to a second data format associated with the target. The tokenizer does so in order to let a first application using a first format (source) communicate with a second application using a second format (target), while still providing for data security through replacing the sensitive data with a token.

The format translation is performed since on the same service call, the source and the target may have their own format in which they process information. The format translation may also already be done during the interception, hence, before the message is forwarded to the tokenizer, so that the tokenizer acts on a message that has already been translated into the format of the target. During this process, the interception module does not change the message content itself.

In some examples, in response to determining that a data format of the message is associated with both, the source and the target, the interception module is configured to forward the message from the source to the target with said data format.

Hence, if the source and target use the same format, no translation is to be performed.

In some examples, the source and/or the target is in one of the following migration states: fully migrated to a tokenization ready state, partially migrated to a tokenization ready state, and not migrated to a tokenization ready state.

The differences between sources and targets in a tokenization ready state, partially migrated to a tokenization ready state and not migrated to a tokenization ready state are now explained for an exemplary application being used as a source/target.

A non-migrated application typically processes sensitive data only in clear (i.e. non-tokenized), and may not be able to process messages including tokens.

A partially migrated application typically processes sensitive data for some services, but not for others. This state exists as the tokenization system may allow applications to gradually migrate their services to the tokenization solution. The migration can be done independently from the application clients, and can be done with the minimum of configuration (potentially done by the caller application team) on called services.

A fully migrated application typically processes sensitive data in form of tokens and typically does not process, log or store any sensitive data in a non-tokenized format. Such applications thus fulfill a highest security standard than non-migrated or partially migrated applications.

In some examples, the interception rules determine whether or not the intercepted message is to be forwarded to a particular one of the plurality of tokenizers depending on the migration state of the source and/or the target.

A non-migrated service may have no interception rule or one describing that the query, and/or the reply of the service may contain certain types of sensitive data explicitly accepted in clear by the application. A migrated service shall have an interception rule describing that the query, and/or the reply may contain certain types of sensitive data, this time accepted in tokens. On top of this, rules shall be configured in the tokenizer to replace sensitive data by tokens in the message's payload.

In some examples, the interception module is configured to forward the message to a particular one of the plurality of tokenizers based on the migration state of the source and/or the target.

The interception module maintains a mapping between a sensitive data type and its corresponding tokenizer. The message is then forwarded to the tokenizers depending on which type of sensitive data needs to be transformed to be accepted by the target. The substitution is concealed in relation to the outside world, e.g. the clients.

This is a difference to the prior art document US 2013/0212024 A1 mentioned at the outset, according to which a mobile device can tokenize communication data based on device information and session information associated with the mobile device. In US 2013/0212024 A1, the tokenization is, at least in part, performed at the client device itself, such that there the substitution is not concealed from the outside world.

When testing the tokenization system, the substitution by the tokenizer(s) may be simulated via a flow probe and an interception detection on full flows, as well as via isolated test messages, which are locally injected in applications communicating with each other over the common bus architecture, the interception module and the tokenizer(s).

All applications may be migrated towards a full tokenization ready state in the end, which eventually renders a differentiation between different migration states moot.

In some examples, the interception module is configured to break the communication between the source and the target when it is determined that the tokenizer is faulty, and wherein the interception module is configured to send an error message to the source.

In some examples, the interception module is configured to reject a message from the source when it is determined that the tokenizer is faulty, thereby preventing a token leakage.

An application, i.e. the source and/or the target, may have the ability to handle clear data for a fall-back mode of operation. The application may process data as clear if there has a fault occurred in the tokenizer.

Fall-back rules to handle a fault in the tokenization system are, for example, provided as an update to the source and/or target, e.g. an application. In some examples, it is determined that the tokenizer is faulty, data transmission in the clear between the source and the target is allowed as a fall-back via the common bus architecture. Alternatively, the communication between the source and target may be ceased completely in the event of a detected fault of the tokenizer.

The interception module is configured to break the communication if a tokenizer is faulty and optionally sends an error message to the source (application).

A general rule may be to never risk to leak a token—in a sense that a message is rather rejected than to leak a token.

In some examples, the source and/or the target is/are an entity, an application or an internal system or an external system such as a cloud system.

An example for an internal system may be a local or distributed company network in which client stations and server are interconnected by the common bus architecture. An example for an external system would be a system for passport detail verification and/or itinerary verification. A further example for an external system would be a payment/banking service. For example, a source in the internal system (e.g. a server of the company) may communicate and exchange messages with a target in the external system (e.g. the passport detail verification system) via the common bus architecture.

According to the second aspect, a method of tokenizing data exchanged between two or more applications is provided. The method comprises the activities of:

intercepting, by an interception module, data from the at least one source, wherein at least one of the messages comprises sensitive data, wherein the interception module is part of a common bus architecture to which the two or more sources and targets are connected, wherein the two or more sources and targets communicate with each other via the common bus architecture, tokenizing sensitive data, via a tokenizer, wherein the tokenizer is coupled to the common bus architecture and receives the sensitive data via the common bus architecture.

According to the third aspect, a computer program product comprising program code instructions stored on a computer readable medium to execute the method steps according to the second aspect, when said program is executed on a computer device, is provided.

According to the fourth aspect, a computerized system of tokenization of data exchanged between one or more sources and targets is provided. The computerized system comprises:
- at least one processor;
- at least one non-volatile memory;
- at least one source and target;
- a common bus architecture to which the at least one source and target are connected, and via which the at least two sources and targets communicate using messages;
- an interception module, which is a part of the common bus architecture,
- a tokenizer, being coupled to the common bus architecture,
- program code, stored in the non-volatile memory, causing the at least one processor to:
  - intercept messages, by the interception module, from the at least one source and target, wherein at least one of the messages comprises sensitive data; and
  - receive and tokenize, by the tokenizer, sensitive data received via the common bus architecture.

BRIEF DESCRIPTION OF THE DRAWINGS

Examples of the invention are now described, also with reference to the accompanying drawings, wherein FIG. 1 schematically illustrates an example of a tokenization system with an enterprise service bus with an appended tokenizer, the service bus communicating with three applications with different migration states, FIG. 2a schematically illustrates the tokenization system of FIG. 1 processing messages communicated from an application A to an application B and vice versa, with different message formats, FIG. 2b schematically illustrates the configuration of the tokenizer according to FIG. 1 and FIG. 2a in more detail, FIG. 3 schematically illustrates activities carried out by the example of a tokenization system given by FIG. 2a, when messages are communicated between said applications A and B with different formats, FIG. 4 schematically illustrates a further example of a tokenization system applied to handle the communication between five applications with different migration states, FIG. 5a schematically illustrates an example for the processing of a message from a source that is intercepted, tokenized and forwarded to a target, FIG. 5b schematically illustrates an example for the processing of a message that is intercepted, detokenized and forwarded to a target, FIG. 5c schematically illustrates an example for the processing of a message that is intercepted, tokenized and forwarded to a target, wherein the processing involves the selection of a tokenizer, FIG. 5d schematically illustrates an example for the selection of a tokenizer according to FIG. 5c in greater detail, FIG. 6 schematically illustrates an example of dealing with faults of a tokenizer, FIG. 7 schematically illustrates an example of a computerized system on which the methods illustrated by FIGS. 1 to 6 are implemented.

The drawings and the description of the drawings are of examples of the invention and are not of the invention itself. Like reference signs refer to like elements throughout the following description of examples.

DESCRIPTION OF EXAMPLES

Figure 1:
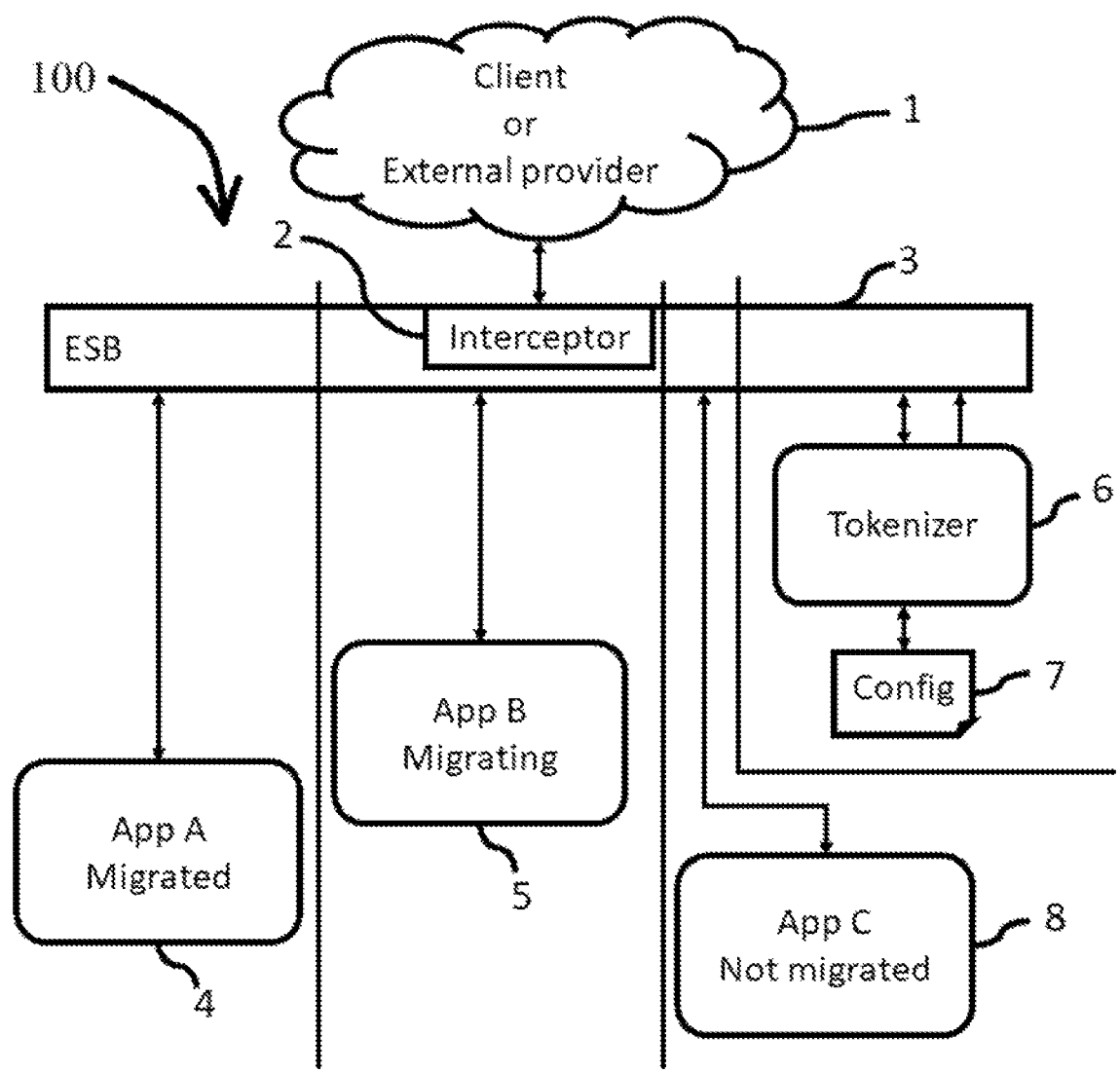

An example of a tokenization system with an enterprise service bus with an appended tokenizer, the service bus communicating with three applications with different migration states, illustrated by FIG. 1.

A client or an external provider 1 communicates via an enterprise service bus 3 (ESB), serving as common bus architecture, with application A 4, application B 5 and application C 8.

Messages from the client or external provider 1 to the application A 4, application B 5 or application C 8 are intercepted at the enterprise service bus 3, corresponding to a common bus architecture, by an interceptor 2, corresponding to an interception module. Likewise, messages from application A 4, application B 5, or application C 8 to the client or external service provider 1 are intercepted by interceptor 2.

The interceptor 2 decides on the basis of interception rules (see FIG. 2b) whether or not messages from the client or external service provider 1 or any of the applications 4, 5 and 8 contain sensitive data and should therefore be forwarded to a tokenizer 6.

Flags, as indicators, contained in the messages or within the message's metadata may indicate whether the message contains sensitive data or not. The interceptor 2 may use these flags to decide whether the message is forwarded to a tokenizer 6 or not or to which tokenizer 6 (of potentially several tokenizers 6) the message is forwarded. Messages that do not contain sensitive data may also be forwarded to one of the applications 4, 5 or 8 or to the client or external provider 1 by the interceptor 2 directly, without passing them to the tokenizer 6 first.

In this example, the application A 4 is an application that has been fully migrated to a tokenization ready state, whereas the application B 5 is an application that is still (ongoing) migrating to a tokenization ready state and the application C 8 is an application that has not yet been migrated to a tokenization ready state at all.

The tokenizer 6 will replace the sensitive data contained in the messages intercepted and forwarded to the tokenizer by tokens according to a type of tokenization that may depend on the type of sensitive data to be tokenized. The type of tokenization used for a specific kind of sensitive data to be tokenized may be specified by the config file 7, for example, by substitution rules.

A property of a token used may be length preservation. The token may be to be replaced in the messages without altering the message grammars. Also a consistency check may be preserved, for example, for Luhn compatibility for credit card numbers.

Thus, the sensitive data in the message is replaced by non-sensitive data (=token(s)) to be processed by the client or external service provider 1 or one of the applications 4,

5, 8. An encrypted association table between the sensitive data and the token(s) may be stored at the tokenizer. However, any other form of tokenization may be applied.

Since application C 8 has not been migrated to a tokenization ready state, this application C 8 may only be capable of processing data in clear. The interceptor 2 may only forward such messages to or from this application C 8 that contain the data a clear, i.e., non-tokenized, form.

The migrating application B 5 may provide some services that are already tokenization ready while others may not be tokenization ready yet. The interceptor 2 may only forward tokenized messages to those services of migrating application B 5 are already tokenization ready.

The fully tokenization ready application A 4 may send/receive and process any type of sensitive data that has been tokenized.

Figure 2A:
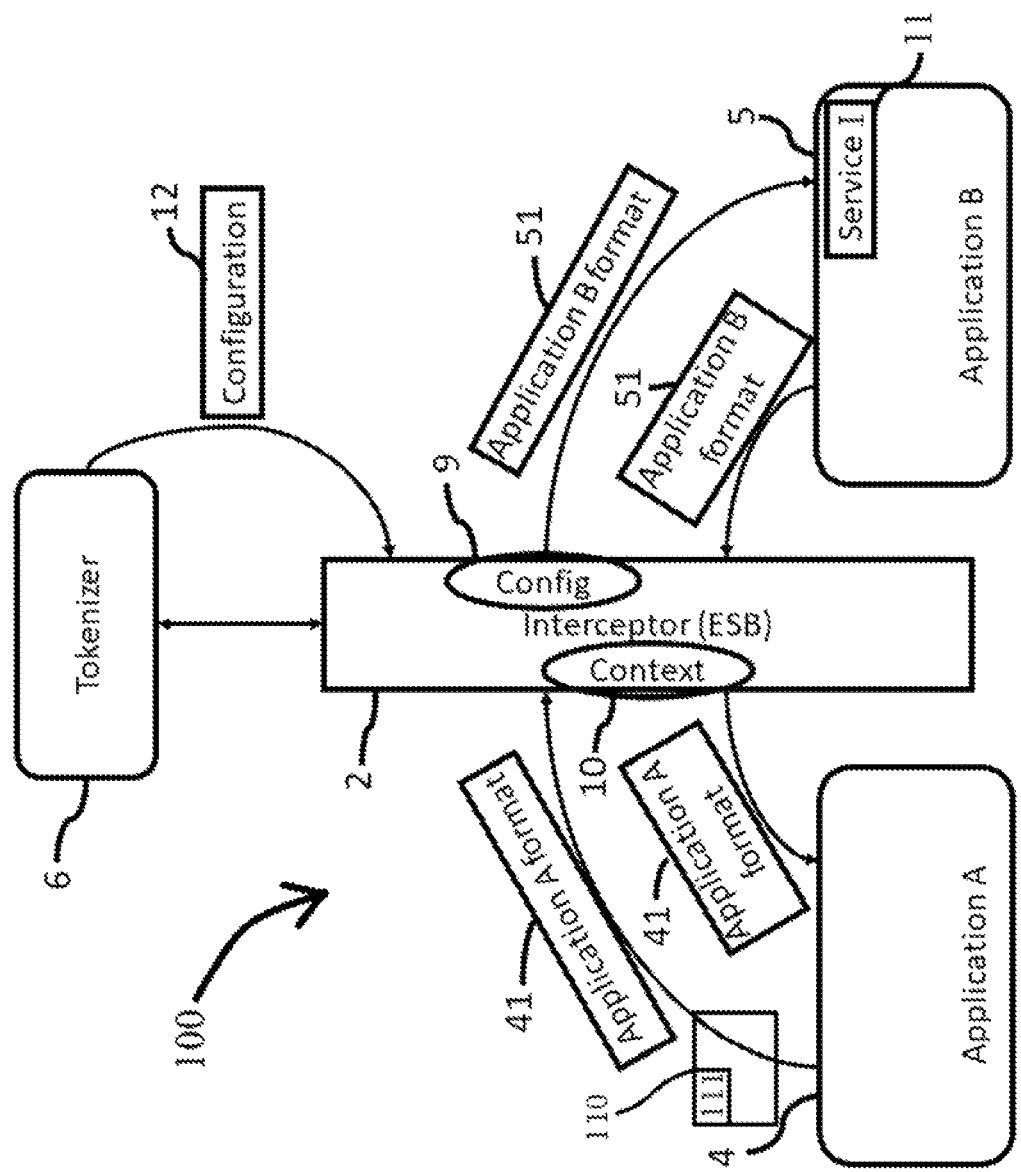

The tokenization system of FIG. 1, processing messages communicated from an application A to an application B and vice versa, with different message formats, is schematically illustrated by FIG. 2a.

The application A 4 sends a message with an application A format 41 towards the ESB (see FIG. 1) on which an interceptor 2 is running and intercepts the message. Depending on a specific context 10 (a choice to forward only messages of a specific type to the tokenizer 6), the message 110 formatted with an application format A 41 is forwarded by the interceptor 2 to the tokenizer 6. The message 110 may be forwarded to the tokenizer 6 in response to determining that the message contains sensitive data. The determination whether the message 110 contains sensitive data or not may be decided based upon reading out an indicator 111 contained in the message 110.

At the tokenizer 6, the sensitive data in the message (if present) is replaced by a token. This replacement may be performed according to substitution rules (see FIG. 3) set in the configuration 12 of the tokenizer 6 or the entire tokenization system 100.

Either before or after this tokenization, the interceptor 2 or the tokenizer 3 itself may translate the format of the message from the application A format 41 to the application B format 51. The specifics of this translation may depend on settings in a config file 9.

The interceptor 2 forwards the translated message in application format B 51 to the application B 11. The interceptor 2 may forward the message to a particular service of the application B 11, e.g. service I 5.

The message containing tokenized sensitive data may be processed by the application B and a response message in application format B 51 may be transmitted to the ESB (see FIG. 1). The response message is intercepted there by the interceptor 2 and, since the message contains tokenized data, is forwarded to the tokenizer 6 for detokenization.

Before or after this detokenization activity, the message is translated back to the application A format 41. The message translated to application A format 41, including the sensitive data again in clear, is forwarded to the application A as a response from application B.

Figure 2B:
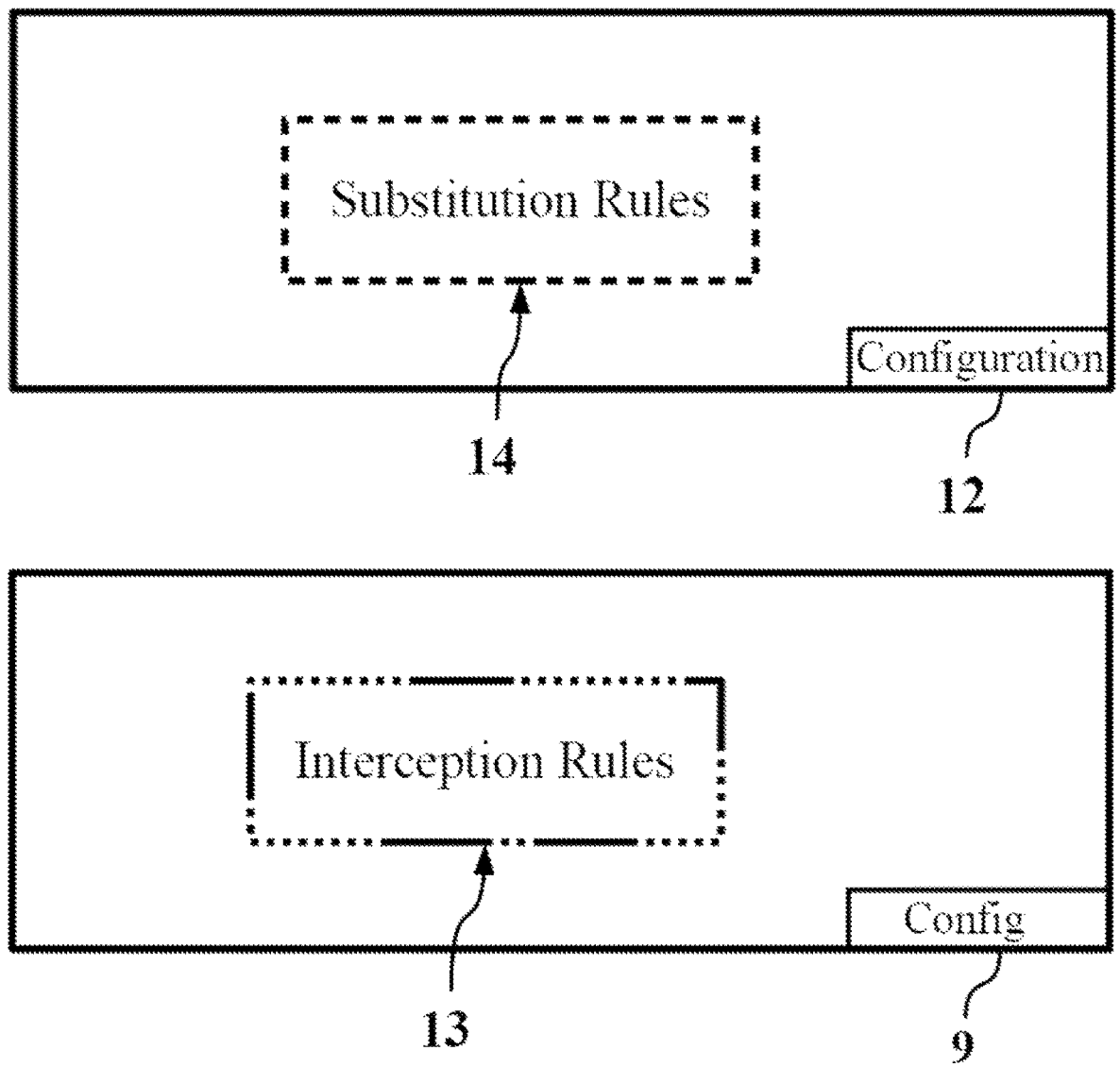

FIG. 2b schematically illustrates the configuration 12 of the tokenizer according to FIG. 1 and FIG. 2 in more detail.

The configuration 12 of the tokenizer may contain substitution rules 14. The substitution rules 14 for the tokenizer 6 may define which type of sensitive data should be replaced by which type of token. The tokenizer 6 may detect which kind of sensitive data is contained in the message received by the tokenizer 6. Depending on the substitution rules 14, the tokenizer may apply a particular type of tokenization and/or a particular type of token. To provide an example, for a message including passport data, vault tokenization may be applied, while for a message including payment data, vaultless tokenization may be applied.

The configuration, short "config" 9 of the interceptor may contain interception rules. The interception rules may define which messages from the source (e.g. application A 4 or application B 5 in FIG. 2) are to be forwarded to the tokenizer before forwarding the message processed by the tokenizer 6 (see FIGS. 1 and 2) to the target (e.g. application A 4 or application B 5 in FIG. 2) and which messages from the source are to be forwarded to the target without processing by the tokenizer 6. The interception rules 13, for example, define that a message sent or to be received by an application 4, 5 (see FIG. 2) dealing with sensitive data has to be forwarded to a tokenizer 6, whereas a message sent or to be received by an application 4, 5 that is dealing with non-sensitive data is not forwarded to the tokenizer 6.

Figure 3:
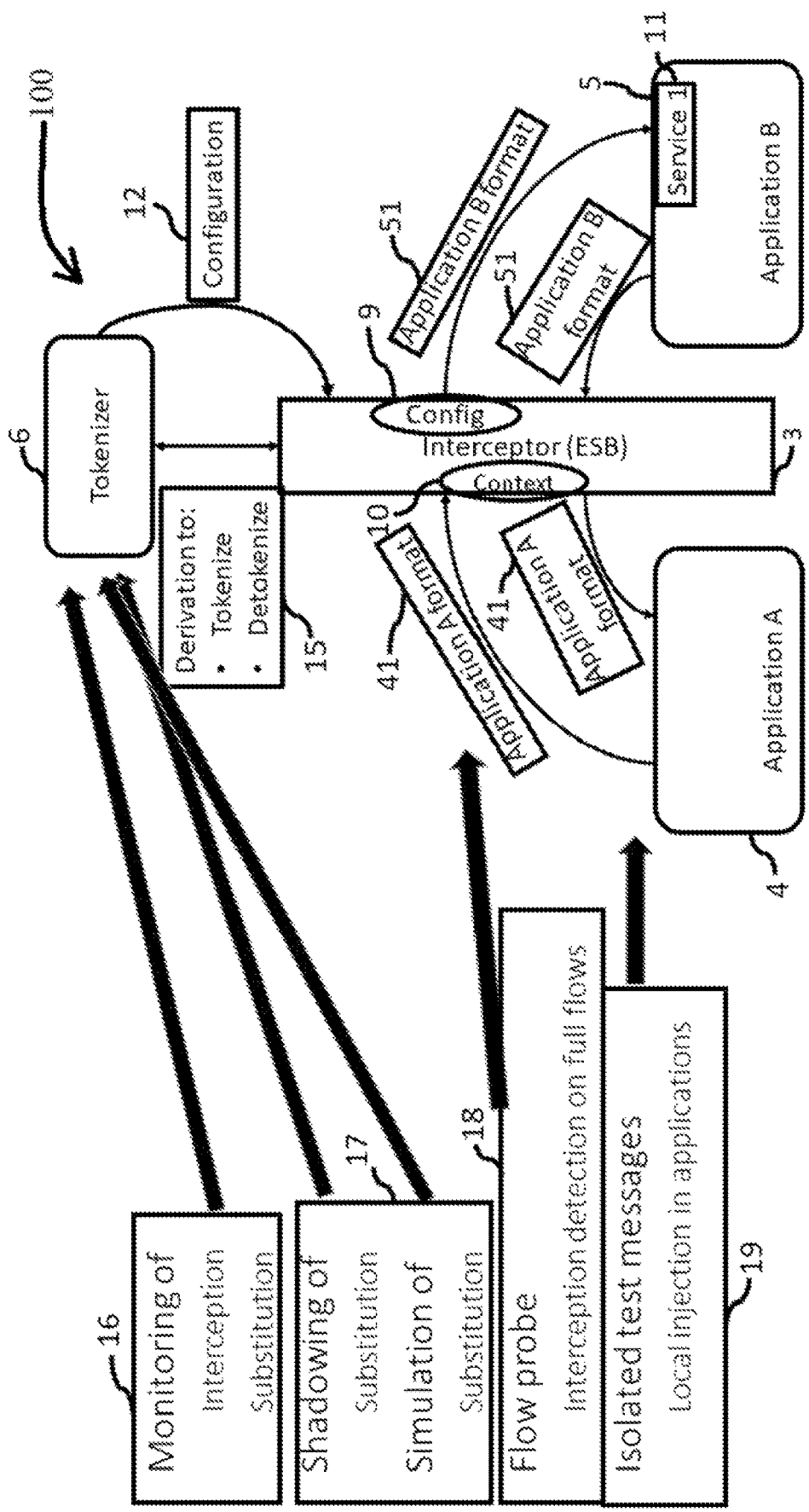

Activities carried out by the example of a tokenization system given by FIG. 2, when messages are communicated between said applications A and B with different formats, are schematically illustrated by FIG. 3.

The tokenizer 6 may be programmed to perform activities of monitoring the interception and substitution applied to messages, i.e. may be equipped with a monitoring program 16. By such a monitoring program 16, the tokenizer may detect whether an interception of a message or a substitution of sensitive content by tokens has been successful or not and may one or more error messages in response to detecting that either the interception or the substitution has been faulty.

In response to such error messages being issued, a fallback mechanism could be initiated in order to enable the applications to process the sensitive data in clear or the entire communication between messages via the common bus architecture is interrupted.

The tokenizer 6 may also be programmed to shadow the substitution of data and to simulate the substitution in an activity 17.

Shadowing the substitution refers to the fact that the application A 4 and/or the application B 5 and clients on which these applications may be running should be unaware of the fact that a tokenization takes place. The simulation of a substitution may be employed to test the substitution in a test routine for the tokenization system 100.

A flow probe to provide an interception detection on full flows may be provided via messages deliberately sent to the tokenization system 100 in an activity 18, in particular the common bus architecture (ESB) and the interceptor 2 in order to obtain a flow analysis.

It may be tested via such flow probes, whether or not the interception/tokenization/detokenization is carried out fast enough so that the communication between clients of applications acting as sources and/or targets is not substantially slowed down by the interception/tokenization/de-tokenization.

Likewise, also isolated test messages may be locally injected in applications in an activity 19, also to test whether the tokenization system works correctly and/or within process speed limits.

Figure 4:
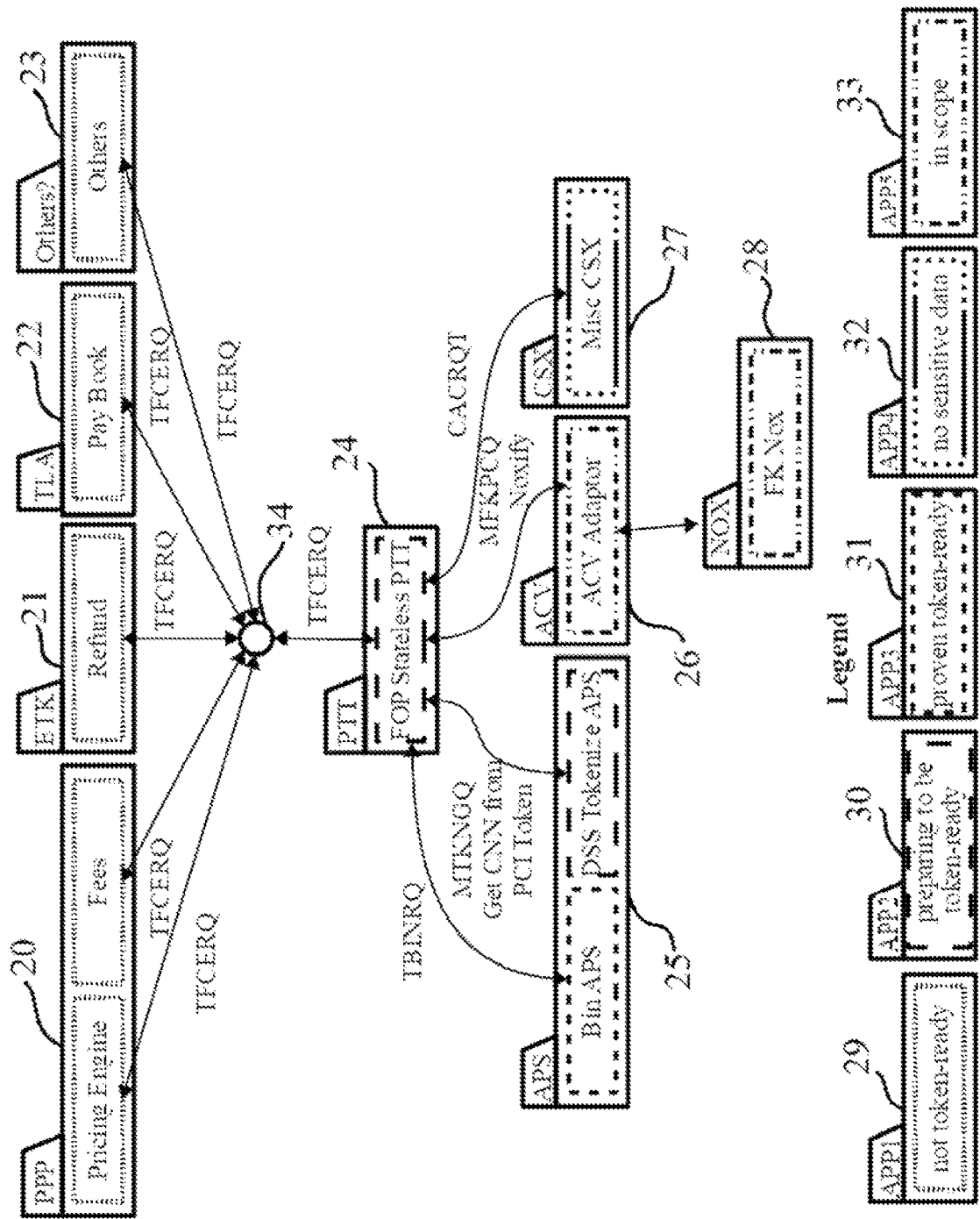

A further example of a tokenization system applied to handle the communication between five applications with different migration states, is illustrated by FIG. 4.

Communication from the applications PPP 20, ETK 21 and TLA 22 as well as other applications 23 is intercepted at an interceptor 34. This interceptor 34 may be implemented on the common bus architecture PTT 24. All clients from PPP 20 to the other applications 23 may have different levels of migration. Nonetheless, the interception solution will continue to work.

Please note that the application and module names used in FIG. 4, like PPP 20, ETK 21 or CSX 27, are purely generic and do not imply a specific type of application or the like.

Communication between the applications APS 25, CSX 27 and the apps PPP 20, ETK 21, TLA 22 may occur solely through the common bus architecture PTT 24.

The applications PPP 20, ETK 21, TLA 22, as well as the other applications 23, as explained in the legend of FIG. 4, all have the migration state not token ready. This goes for the services pricing engine and fees provided by the application PPP 20, for the refund service provide by the application ETK 21, for the pay book service provided by the application TLA 22 and by the others service of the other applications.

The migration state of the application APS 25 is that the service Bin APS provided by the application APS 25 is proven token ready while the service DSS Tokenize APS, also provided by the application APS 25, is preparing to be token ready. The migration state of the application CSX 27 is that the service provided by this application Misc CSX is not dealing with sensitive data and is not providing sensitive data.

The application ACV 26 is a tokenizer application, which may be configured according to configurations provided by application NOX 28.

The clear accepting application CSX 27 may receive messages without sensitive content via the application PTT 24 from the PPP application 20, the ETK application 21, the TLA application 22 or other applications 23 without tokenization by the tokenizer application ACV 26.

The application APS may accept tokenized messages only with its service bin APS, which is proven token ready, but not with its serves DSS Tokenize APS, which is only preparing to be token ready.

Figure 5A:
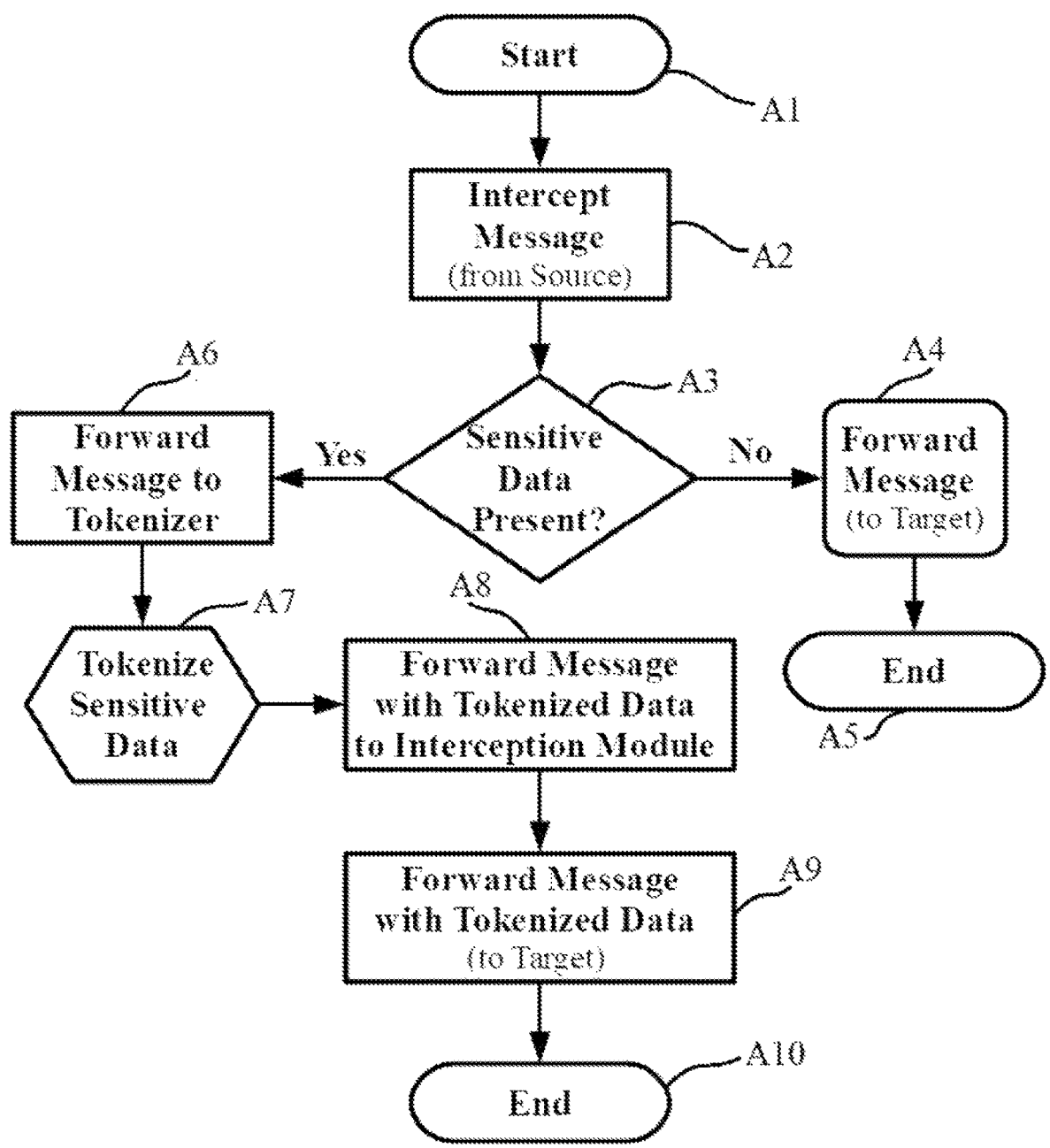

An example for the processing of a message from a source that is intercepted, tokenized and forwarded to a target by an example of a tokenization system is schematically illustrated by FIG. 5a.

Subsequent to a start activity A1, the message is intercepted from a source in an activity A2. It is thereafter checked in an activity A3, whether sensitive data is present in the intercepted message.

In response to identifying that there is no sensitive data present in the message, the message is forwarded to a target in an activity A4. Subsequently the processing ends in an activity A5.

In response to identifying in activity A3 that there is indeed sensitive data present in the message, the message is forwarded to a tokenizer in activity A6.

In an activity A7, the sensitive data is tokenized by at least one tokenizer.

The message with the tokenized data is then forwarded to the interception module again in an activity A8 and subsequently the message with the tokenized data is forwarded to the target in an activity A9. The processing ends in an activity A10.

Figure 5B:
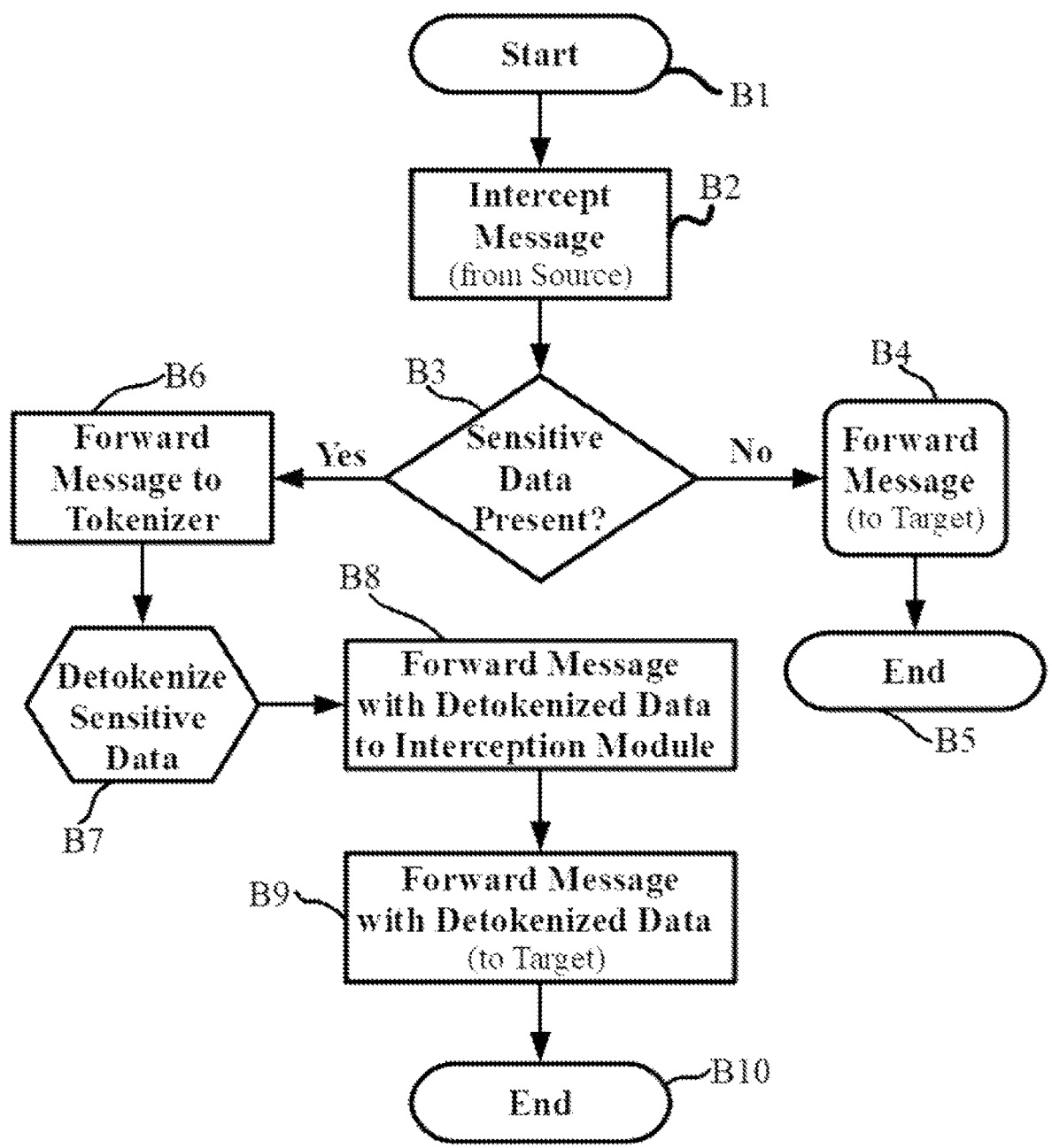

An example for the processing of a message that is intercepted, detokenized and forwarded to a target, is schematically illustrated by FIG. 5b.

After a start of the process in activity B1, the message is intercepted from the source in an activity B2.

In the activity B3, it is checked whether sensitive data is present in the message.

In response to determining that no sensitive data is present in the message in said activity B3, the message is forwarded to the target in an activity B4. Subsequently to forwarding the message, the process is ended in an activity B5.

In response to determining that sensitive data is present in the message in said activity B3, the message is forwarded to the tokenizer in an activity B6.

In a subsequent activity B7, the sensitive data is detokenized. Hence, the token, which replaced the sensitive data in the first place, is again replaced by the sensitive data in clear.

In an activity B8, the message with the detokenized data is forwarded to the interception module.

In an activity B9, the message with the detokenized data is forwarded to the target. In an activity B10, the process is ended.

Figure 5C:
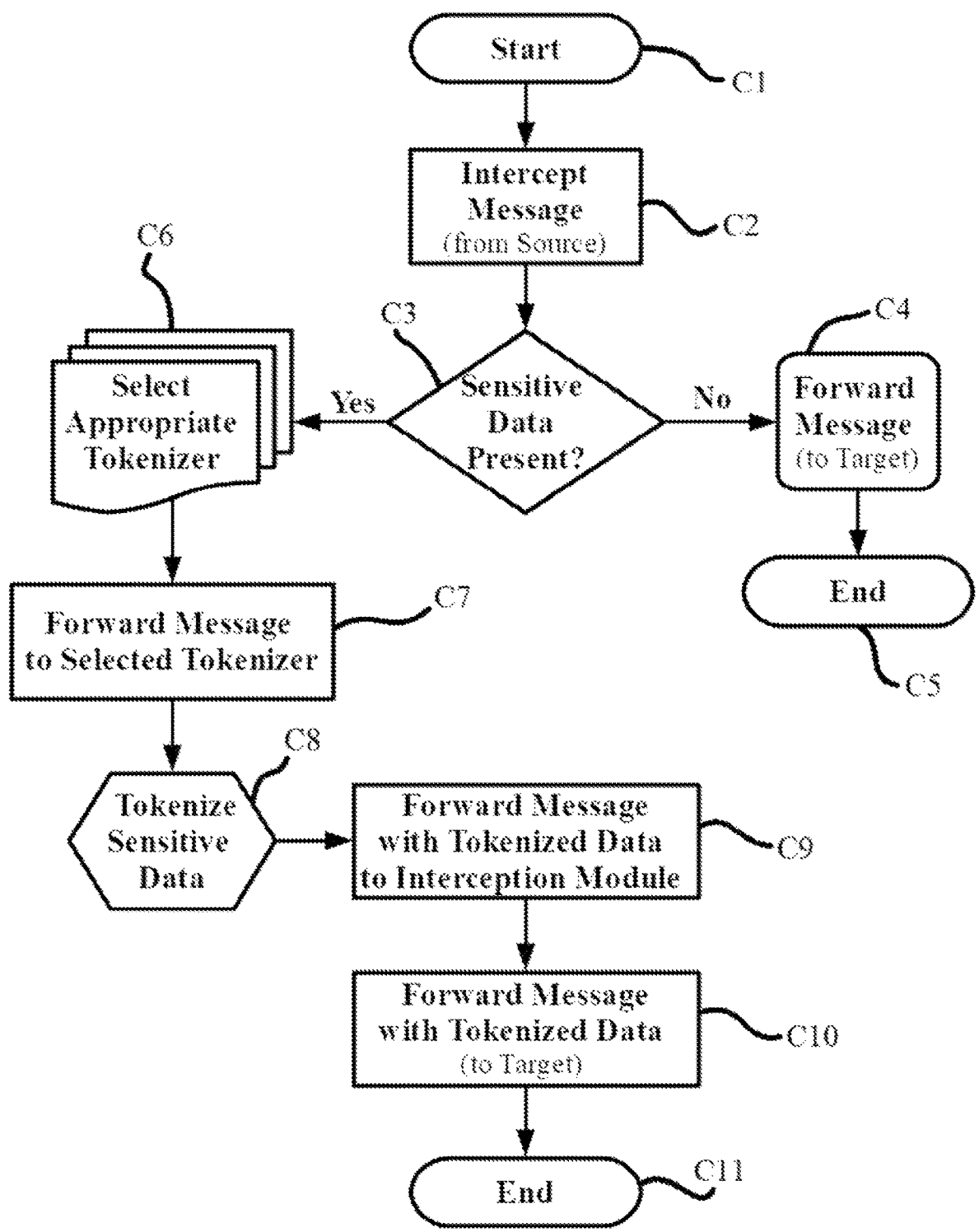

An example for the processing of a message that is intercepted, tokenized and forwarded to a target, wherein the processing involves the selection of a tokenizer, schematically illustrated by FIG. 5c.

After a start of the activity in activity C1, the message is intercepted from the source in an activity C2.

In an activity C3 it is checked whether there is sensitive data present. In response to determining in activity C3 that there is no sensitive data present in the message, the message is forwarded to the target in an activity C4. Subsequently the process is ended in an activity C5.

In response to determining in activity C3 that sensitive data is present in the message, in an activity C6 an appropriate tokenizer—hence a tokenizer suitable to tokenize the specific type of sensitive data present in the message—is selected.

In an activity C7, the message is forwarded to the selected tokenizer.

In an activity C8, the sensitive data in the message is tokenized.

In an activity C9, the message with the tokenized data is forwarded to the interception module.

In an activity C10, message with the tokenized data is forwarded to the target.

Figure 5D:
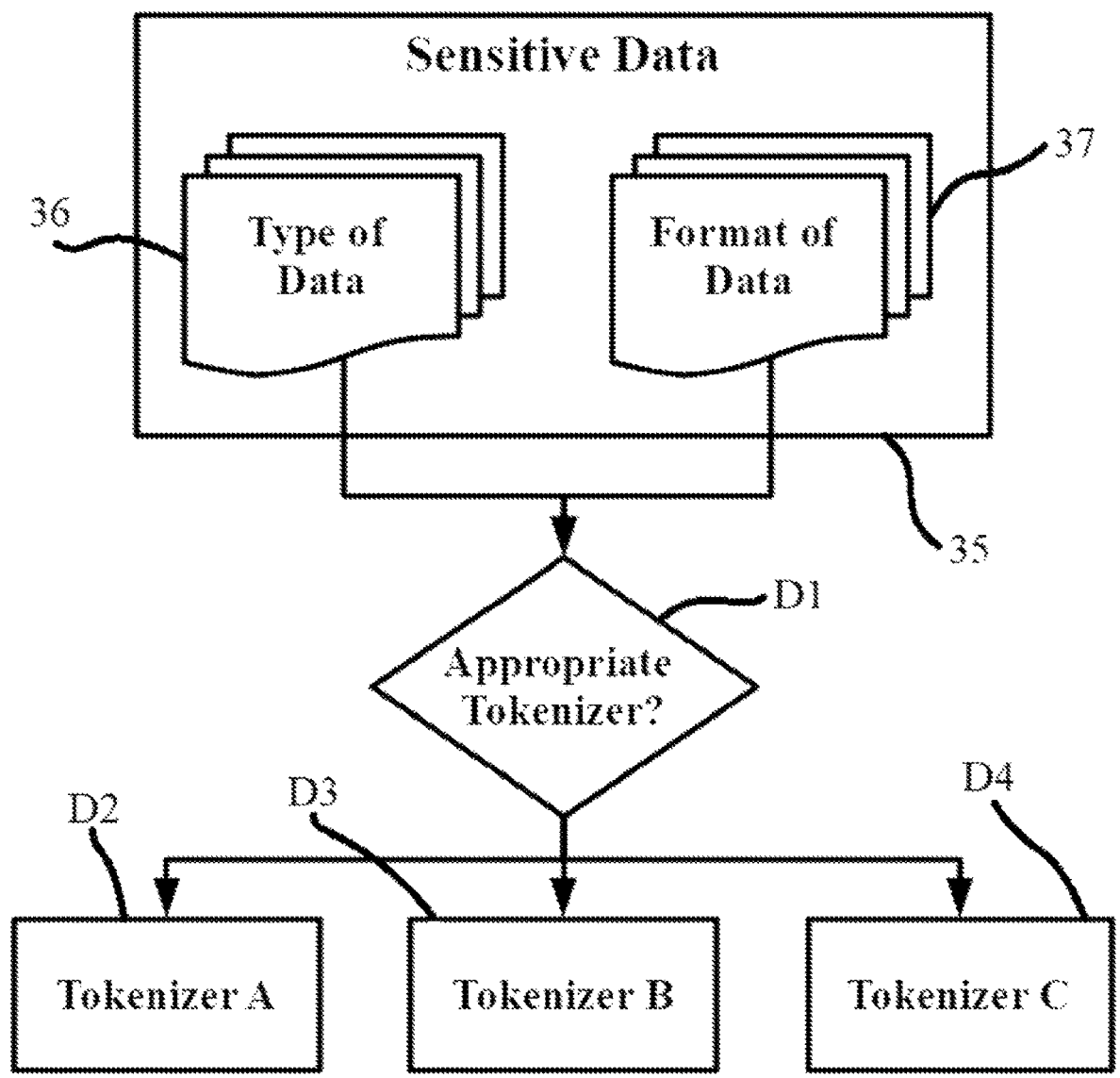

An example for the selection of a tokenizer according to FIG. 5c in greater detail, is illustrated by FIG. 5d.

The sensitive data 35 is categorized according to the type of data 36 and the format of data 37.

According to the type of data 36 and the format of data 37, it is checked in an activity D1 which tokenizer should be selected.

In response to the check in activity D1, in an activity D2, a tokenizer A is selected, or in an activity D3, a tokenizer B is selected, or in an activity D4, a tokenizer C is selected.

Figure 6:
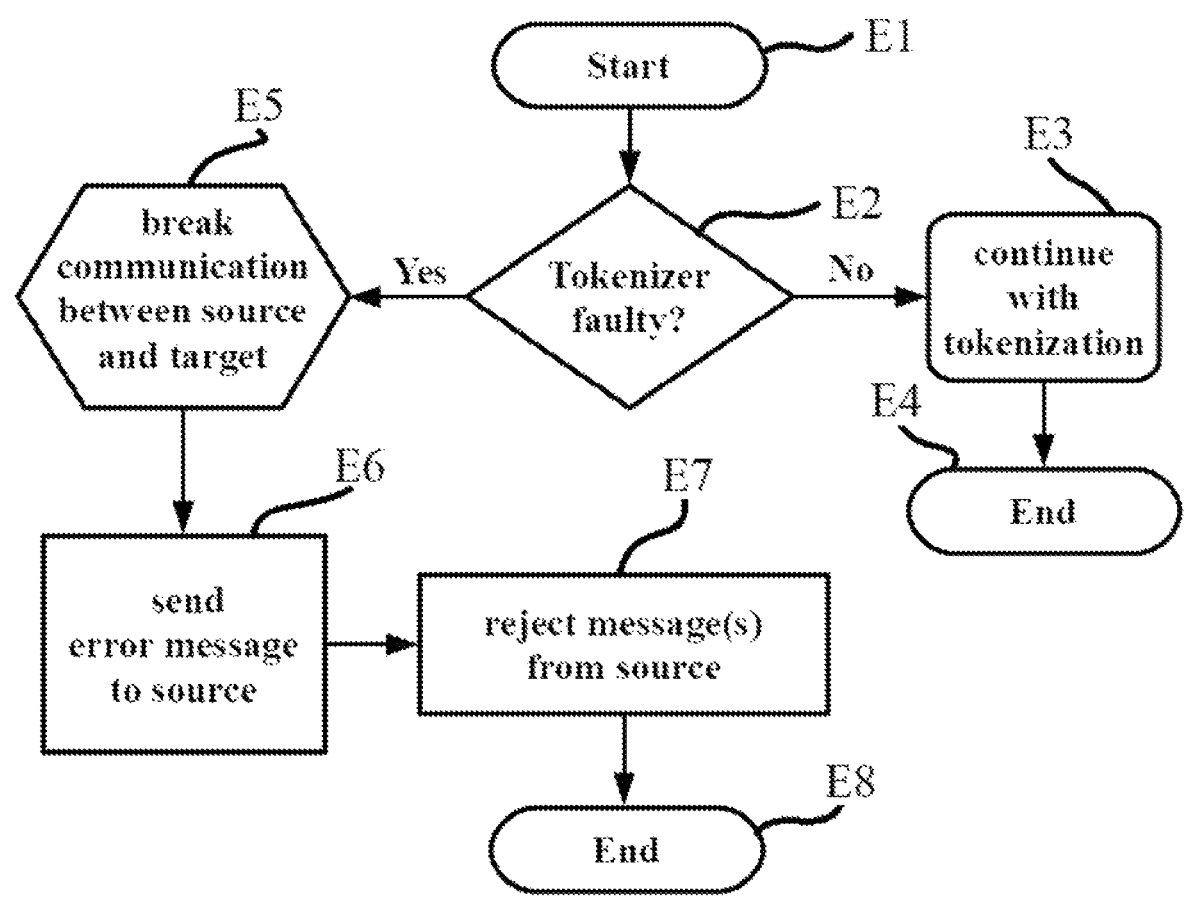

An example of dealing with faults of a tokenizer is schematically illustrated by FIG. 6.

The process is started at an activity E1.

It is determined whether the tokenizer is faulty or not in an activity E2.

In response to determining that the tokenizer is not fault in the activity E2, the tokenization is continued in an activity E3.

The process is thereafter ended in an activity E4.

In response to determining that the tokenizer is faulty in the activity E2, the communication between the source and the target (e.g. applications) is broken in an activity E5.

Also, an error message indicative of the fault of the tokenizer is sent to the source in an activity E6.

In an activity E7, further messages from the source are rejected. The process is ended in an activity E8.

Figure 7:
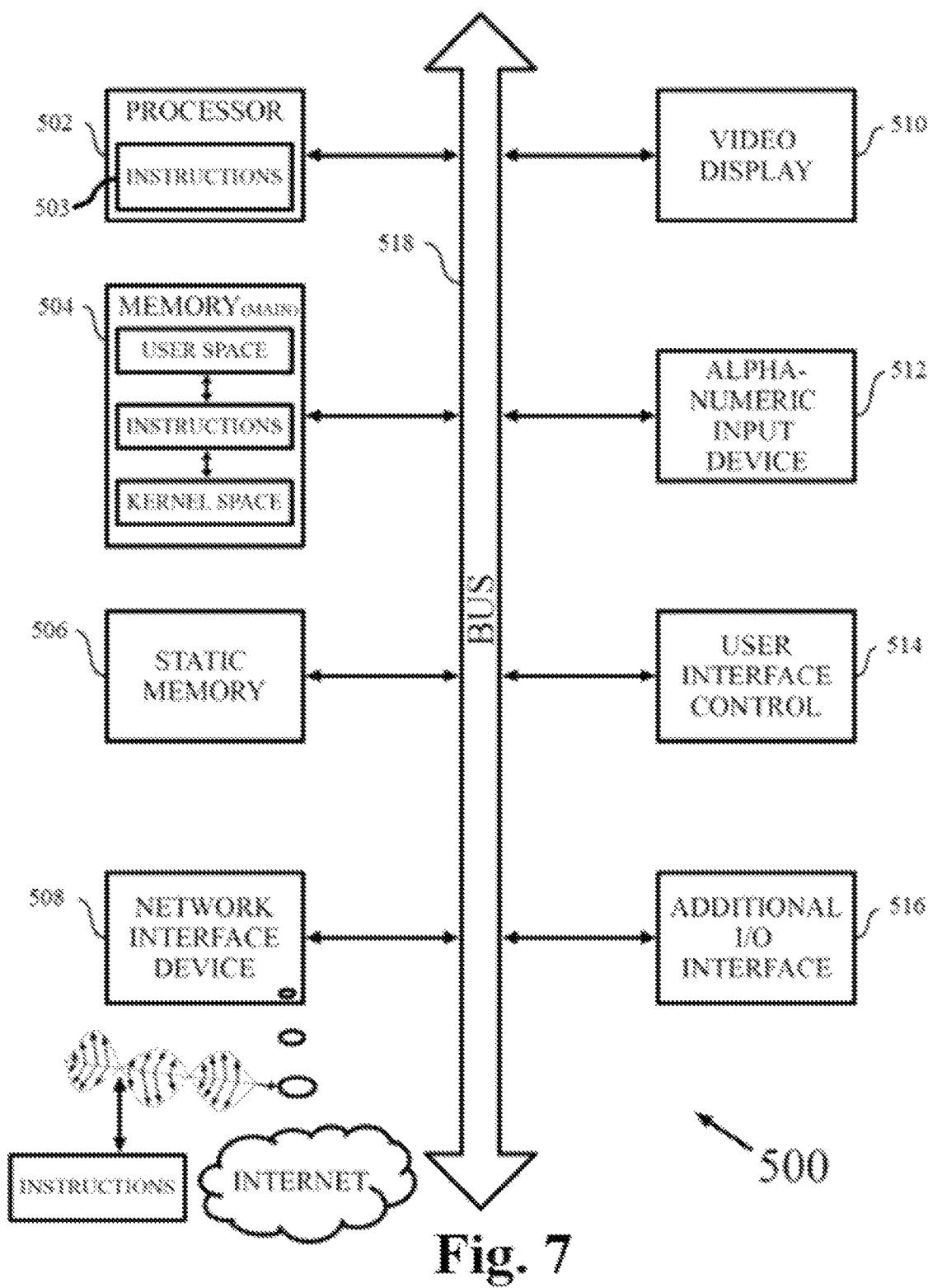

A diagrammatic representation of an exemplary computer system 500 is shown in FIG. 7.

The processor 502 is arranged to execute a set of instructions 503, to cause the computer system 500 to perform any of the methodologies used by the interception module used in a tokenization system, or the computer-implemented method of tokenizing data exchanged between two or more applications, as described herein. The computerized system of tokenization of data exchanged between one or more sources and targets might be arranged like this.

The computer system 500 includes a processor 502, a main memory 504 and a network interface 508. The main memory 504 includes a user space, which is associated with user-run applications, and a kernel space, which is reserved for operating-system- and hardware-associated applications. The computer system 500 further includes a static memory 506, e.g. non-removable flash and/or solid-state drive and/or a removable Micro or Mini SD card, which permanently stores software enabling the computer system 500 to execute functions of the computer system 500. Furthermore, it may include a video display 510, a user interface control module 514 and/or an alpha-numeric and cursor input device 512. Optionally, additional I/O interfaces 516, such as card reader and USB interfaces may be present. The computer system components 502 to 516 are interconnected by a data bus 518.

In some exemplary embodiments the software programmed to carry out (parts of) the method described herein is stored on the static memory 506; in other exemplary embodiments, external databases are used.

An executable set of instructions (i.e. software) 503 embodying any one, or all, of the methodologies described above, resides completely, or at least partially, permanently in the non-volatile memory 506. When being executed, process data resides in the main memory 504 and/or the processor 502.

The invention claimed is:

1. An interception module used in a tokenization system, wherein the tokenization system comprises a source and a target, a common bus architecture, and a tokenizer, wherein the source and the target, the interception module and the tokenizer are communicatively coupled via the common bus architecture,
    the interception module being configured to:
        intercept a message transmitted from the source directed to the target via the common bus architecture,
        in response to determining that the message comprises sensitive data, forward the intercepted message to the tokenizer for tokenization or detokenization,
        wherein the source and/or the target is in one of the following migration states: fully migrated to a tokenization ready state, partially migrated to a tokenization ready state, and not migrated to a tokenization ready state, wherein the interception module is configured to forward the message to a particular one of a plurality of tokenizers based on the migration state of the source and/or the target.

2. The interception module of claim 1, wherein the interception module is arranged to forward the message according to interception rules, wherein interception rules define which messages from the source are to be forwarded to the tokenizer before forwarding the message processed by the tokenizer to the target and which messages from the source are to be forwarded to the target without processing by the tokenizer and wherein substitution rules for the tokenizer define which type of sensitive data should be replaced by which type of token.

3. The interception module of claim 2, wherein the substitution rules are stored locally at the tokenizer.

4. The interception module of claim 1, wherein the tokenization system comprises the plurality of tokenizers and the interception module is further configured to forward the message to a particular one of the plurality of tokenizers based on the type of the sensitive data, wherein different tokenizers are provided for tokenizing different data types and/or data formats.

5. The interception module of claim 4, wherein the messages received by the common bus architecture comprise an indicator from which the interception module can determine which tokenizer should be used to tokenize the sensitive data in the messages.

6. The interception module of claim 1, wherein the tokenizer provides a format translation from a first data format associated with the source to a second data format associated with the target and wherein in response to determining that a data format of the message is associated with both, the source and the target, the interception module is configured to forward the message from the source to the target with said data format.

7. The interception module of claim 1, wherein the interception module is configured to break the communication between the source and the target when it is determined that the tokenizer is faulty, and wherein the interception module is configured to send an error message to the source.

8. The interception module of claim 7, wherein the interception module is configured to reject a message from the source when it is determined that the tokenizer is faulty, thereby preventing a token leakage and wherein when it is determined that the tokenizer is faulty, data transmission in the clear between the source and the target is allowed as a fall-back via the common bus architecture.

9. The interception module of claim 1, wherein the source and/or the target is/are an entity, an application or an internal system or an external system.

10. A computer-implemented method of tokenizing data exchanged between two or more applications, wherein the method comprises:
    intercepting, by an interception module, data from the at least one source, wherein at least one of the messages comprises sensitive data,
    wherein the interception module is part of a common bus architecture to which the two or more sources and targets are connected, wherein the two or more sources and targets communicate with each other via the common bus architecture,
    tokenizing sensitive data, via a tokenizer, wherein the tokenizer is coupled to the common bus architecture and receives the sensitive data via the common bus architecture, wherein a sources and/or a target are in one of the following migration states: fully migrated to a tokenization ready state, partially migrated to a tokenization ready state, and not migrated to a tokenization ready state, wherein the interception module is configured to forward a message to a particular one of a plurality of tokenizers based on the migration state of the source and/or the target.

11. A computerized system of tokenization of data exchanged between one or more sources and targets, wherein the computerized system comprises:
    at least one processor;
    at least one non-volatile memory;
    at least one source and target;
    a common bus architecture to which the at least one source and target are connected, and via which the at least two sources and targets communicate using messages;

an interception module, which is a part of the common bus architecture, a tokenizer, being coupled to the common bus architecture, program code, stored in the non-volatile memory, causing the at least one processor to:

intercept messages, by the interception module, from the at least one source and target, wherein at least one of the messages comprises sensitive data; and receive and tokenize, by the tokenizer, sensitive data received via the common bus architecture, wherein a source and/or a target is in one of the following migration states: fully migrated to a tokenization ready state, partially migrated to a tokenization ready state, and not migrated to a tokenization ready state, wherein the interception module is configured to forward a message to a particular one of a plurality of tokenizers based on the migration state of the source and/or the target.

12. The computerized system of claim 11, wherein the interception module is arranged to forward the message according to interception rules, and wherein the tokenizer is arranged to tokenize sensitive data according to predefined substitution rules and wherein the substitution rules are stored locally at the tokenizer.

13. The computerized system of claim 12, wherein the interception rules and the substitution rules enable the common bus architecture, the interception module and the at least one tokenizer to manage communication between sources and targets that are either fully migrated, partially migrated or not migrated to a tokenization ready state.

14. The computerized system of claim 1, wherein the source is an entity sending a message to the common bus architecture and a target is an entity receiving a message from the common bus architecture, wherein the source is either an application or a system and the target is either an application or a system and wherein the tokenization is performed in the tokenization system without being exposed to clients of the application or system representing the source or target, which send and receive sensitive data without tokenization or encryption.

* * * * *